US012729491B2

(12) United States Patent
Lee et al.

(10) Patent No.: US 12,729,491 B2
(45) Date of Patent: Sep. 8, 2026

(54) VARIABLE CONTROL OF LIQUID DISPERSAL SYSTEM FOR COMPACTOR MACHINE

(71) Applicant: Caterpillar Paving Products Inc., Brooklyn Park, MN (US)

(72) Inventors: Jeremy Wayne Lee, Otsego, MN (US); Matthew Thomas Hanson, St. Louis Park, MN (US); Cary M. Bryant, Plymouth, MN (US); Bryan J. Downing, Champlin, MN (US); Todd Mansell, Rogers, MN (US)

(73) Assignee: Caterpillar Paving Products Inc., Brooklyn Park, MN (US)

( * ) Notice: Subject to any disclaimer, the term of this patent is extended or adjusted under 35 U.S.C. 154(b) by 129 days.

(21) Appl. No.: 18/916,102

(22) Filed: Oct. 15, 2024

(65) Prior Publication Data

US 2026/0103854 A1 Apr. 16, 2026

(51) Int. Cl.
*E01C 19/17* (2006.01)
*B05B 12/02* (2006.01)

(52) U.S. Cl.
CPC ............ *E01C 19/174* (2013.01); *B05B 12/02* (2013.01); *E01C 19/176* (2013.01); *E01C 19/178* (2013.01)

(58) Field of Classification Search
CPC .... E01C 19/174; E01C 19/176; E01C 19/178; B05B 12/02
See application file for complete search history.

(56) References Cited

U.S. PATENT DOCUMENTS

| | | | | |
|---|---|---|---|---|
| 12,059,695 B2 * | 8/2024 | Oetken | ................. | E01C 19/174 |
| 2020/0056340 A1 * | 2/2020 | Thiesse | ............... | G01F 23/0015 |
| 2021/0140126 A1 | 5/2021 | Burger et al. | | |
| 2023/0078995 A1 | 3/2023 | Oetken et al. | | |

FOREIGN PATENT DOCUMENTS

| | | |
|---|---|---|
| CN | 113550204 B | 6/2022 |
| CN | 115418911 A | 12/2022 |
| JP | 7005540 B2 | 1/2022 |

* cited by examiner

*Primary Examiner* — P. Macade Nichols

(57) ABSTRACT

In some implementations, a liquid dispersal system of a compactor machine may obtain configuration information that indicates a quantity of rotations of a compaction element of the compactor machine in association with a dispersal cycle and that indicates a percentage of the dispersal cycle. The liquid dispersal system may determine, based on the configuration information and sensor information, a first time interval of the dispersal cycle and a second time interval of the dispersal cycle. The liquid dispersal system may cause activation of one or more liquid pumps of the liquid dispersal system in accordance with the first time interval. The liquid dispersal system may cause inactivation of the one or more liquid pumps in accordance with the second time interval.

20 Claims, 8 Drawing Sheets

VARIABLE CONTROL OF LIQUID DISPERSAL SYSTEM FOR COMPACTOR MACHINE

TECHNICAL FIELD

The present disclosure relates generally to a liquid dispersal system for a compactor machine and, for example, to variable control of the liquid dispersal system.

BACKGROUND

Compaction of a surface material, such as soil or asphalt, can improve strength and stability of the surface. In a paving context, a paving machine distributes hot paving material, such as asphalt, over a surface, and a mobile compactor machine follows the paving machine to compact the material to a desired density and obtain an acceptable surface finish. Commonly, the compactor machine may include one or more compaction elements (e.g., compaction drums) that serve to propel the compactor machine and compact the paving material via the weight and vibration of the compactor machine. During compaction, paving material, such as asphalt, may stick to a compaction element, which can be detrimental to compaction performance.

Accordingly, the compactor machine may employ a liquid dispersal system that includes a liquid pump to disperse (e.g., spray) liquid, such as water, via one or more liquid dispersal components onto the one or more compaction elements to prevent sticking of paving material. In many cases, an operator of the liquid dispersal system inputs a time duration, typically indicated as a percentage of a duration of a dispersal cycle (e.g., that can be on the order of tens of seconds, such as 40 seconds), for dispersal of liquid, which causes activation of the liquid pump and thereby dispersal of liquid onto the one or more compaction elements for the time duration. However, this is a manual, imprecise, and unintuitive control process that often results in wasting fluid (e.g., by allowing dispersal of more liquid than is necessary to prevent sticking of paving material on the one or more compaction elements), or in a degraded quality of the paving material (e.g., by disallowing dispersal of enough liquid to prevent sticking of paving material on the one or more compaction elements).

U.S. Patent Application Publication No. US2023/0078995 ("the '995 publication") discloses timing control for a fluid spray system of a compactor machine. In the '995 publication, a controller is configured to determine, based on a proportion of a spray cycle in which the fluid spray system is to be active, a spraying timing (e.g., a spraying configuration) for a first fluid pump and a second fluid pump. Additionally, it is noted that the controller determines the spraying timing to minimize an overlap of an active time of the first fluid pump and an active time of the second fluid pump and/or minimize an overlap of an inactive time of the first fluid pump and an inactive time of the second fluid pump. Thus, the '995 publication does not relate to a liquid dispersal system that includes a single liquid pump, and to causing activation of the liquid pump to cause liquid to be dispersed onto a compaction element for a quantity of rotations of the compaction element. Accordingly, a quantity of rotations of a compaction element does not influence the timing control for the fluid spray system described in the '995 publication.

The liquid dispersal system of the present disclosure solves one or more of the problems set forth above and/or other problems in the art.

SUMMARY

In some implementations, a liquid dispersal system includes one or more liquid dispersal components configured to disperse liquid at a compaction element of a compactor machine; one or more liquid pumps configured to supply liquid to the one or more liquid dispersal components; and a controller configured to: obtain configuration information that indicates a quantity of rotations of the compaction element of the compactor machine for which liquid is to be dispersed at the compaction element via the one or more liquid dispersal components during a dispersal cycle and that indicates a percentage of the dispersal cycle associated with the quantity of rotations; obtain sensor information associated with the compactor machine; determine, based on the configuration information and the sensor information, a first time interval of the dispersal cycle for dispersal of liquid at the compaction element via the one or more liquid dispersal components and a second time interval of the dispersal cycle for non-dispersal of liquid via the one or more liquid dispersal components; cause activation of the one or more liquid pumps in accordance with the first time interval; and cause, based on causing activation of the one or more liquid pumps, inactivation of the one or more liquid pumps in accordance with the second time interval.

In some implementations, a compactor machine includes a compaction element; a liquid dispersal system, comprising: one or more liquid pumps; and a controller configured to: obtain configuration information that indicates a quantity of rotations of the compaction element for which liquid is to be dispersed at the compaction element during a dispersal cycle and that indicates a percentage of the dispersal cycle associated with the quantity of rotations; obtain sensor information; determine, based on the configuration information and the sensor information, a first time interval of the dispersal cycle for dispersal of liquid at the compaction element and a second time interval of the dispersal cycle for non-dispersal of liquid; cause activation of the one or more liquid pumps in accordance with the first time interval; and cause, based on causing activation of the one or more liquid pumps, inactivation of the one or more liquid pumps in accordance with the second time interval.

In some implementations, a method includes obtaining, by a liquid dispersal system of a compactor machine, configuration information that indicates a quantity of rotations of a compaction element of the compactor machine in association with a dispersal cycle and that indicates a percentage of the dispersal cycle; determining, by the liquid dispersal system, and based on the configuration information and sensor information, a first time interval of the dispersal cycle and a second time interval of the dispersal cycle; causing, by the liquid dispersal system, activation of one or more liquid pumps of the liquid dispersal system in accordance with the first time interval; and causing, by the liquid dispersal system, inactivation of the one or more liquid pumps in accordance with the second time interval.

DETAILED DESCRIPTION

This disclosure relates to a liquid dispersal system, which is applicable to any machine that utilizes liquid dispersal, such as a machine that utilizes one or more liquid pumps and one or more liquid dispersal components.

Figure 1:
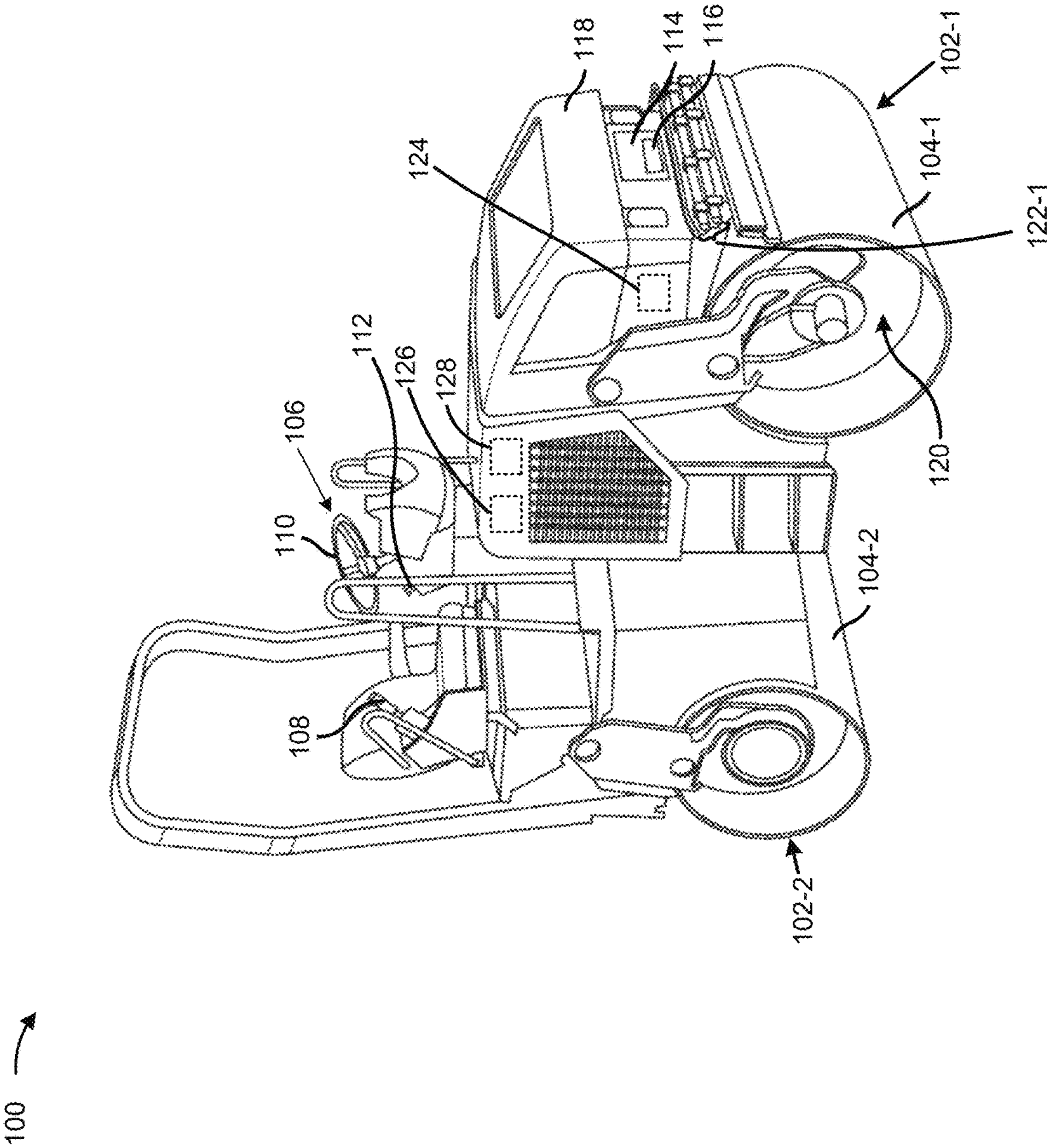
FIG. 1 is a diagram of an example machine described herein.

FIG. 1 is a diagram of an example machine 100 described herein. While in FIG. 1 the machine 100 is depicted as a compactor machine, the machine 100 may be another type of machine. The machine 100 may be an asphalt compactor machine (e.g., a self-propelled, double-drum compactor machine), a vibratory drum compactor machine, or the like, which may be used to compact various materials, such as soil and/or asphalt, among other examples.

The machine 100 has at least one compaction element 102, such as a compaction drum. For example, as shown, the machine 100 has a front compaction element 102-1 and a back compaction element 102-2. The compaction elements 102-1, 102-2 provide ground engagement of the machine 100 at surfaces 104-1, 104-2 of the compaction elements 102-1, 102-2, respectively. The surfaces 104-1, 104-2 may include cylindrical surfaces that form exteriors of shells of the compaction elements 102-2, 102-2, respectively. As the machine 100 passes over a mat of paving material, the surfaces 104-1, 104-2 roll against the paving material and provide compaction forces to the paving material due to a weight and/or a vibration of the machine 100. In some examples, the machine 100 may include one or more other ground engagement members, such as one or more wheels and/or one or more tracks, in addition or alternatively to the front compaction element 102-1 or the back compaction element 102-2.

The machine 100 includes an operator station 106 equipped with various systems and/or mechanisms for control of the operation of the machine 100. For example, the operator station 106 may include a drive system control 108 (shown as a shift lever) and/or a steering system control 110 (shown as a steering wheel). In addition, the operator station 106 may include a control interface 112. The control interface 112 enables an operator, or other user, of the machine 100 to indicate configuration information associated with a liquid dispersal system (e.g., liquid dispersal system 202, described herein in connection with FIGS. 2A-2E). The configuration information may indicate, for example, a quantity of rotations of a compaction element 102 (e.g., the front compaction element 102-1 or the back compaction element 102-2) for which liquid is to be dispersed at the compaction element 102 during a dispersal cycle (e.g., as further described herein in relation to FIGS. 2A-2E) and/or a percentage of the dispersal cycle associated with the quantity of rotations. The control interface 112 may include a dial, a knob, a lever, and/or a touchscreen interface.

The machine 100 includes an engine 114 and a generator 116 coupled with the engine 114, which are attached to a frame 118 of the machine 100. The generator 116 may serve as an electrical power source for various onboard systems and components of the machine 100. The engine 114 may include any type of engine (e.g., internal combustion, gas, diesel, gaseous fuel, natural gas, propane, or the like) or an electric motor. The engine 114 is configured to drive movement of the machine 100 (e.g., via compaction elements 102-1, 102-2). The machine 100 also includes a braking system 120 configured to decrease or arrest a speed of the machine 100.

The machine 100 includes one or more liquid dispersal components 122, which may be part of the liquid dispersal system (e.g., the liquid dispersal system 202). Each liquid dispersal component 122 may include a liquid spray bar, one or more nozzles for dispersing liquid (e.g., water), a conduit that supplies liquid to the liquid spray bar or the one or more nozzle, and/or other components. The one or more liquid dispersal components 122 may be configured to disperse liquid (e.g., water) at one or more of the compaction elements 102. As shown, the machine 100 includes a set of one or more first liquid dispersal components 122-1, which may be configured to disperse liquid at the front compaction element 102-1 (e.g., at the surface 104-1 of the front compaction element 102-1). The machine 100 additionally or alternatively may include a set of one or more second liquid dispersal components 122-2 (not shown) that direct fluid at the surface 104-2 of the back compaction element 102-2.

The one or more liquid dispersal components 122 may be connected (e.g., fluidly connected) to one or more liquid pumps 124, which may be part of the liquid dispersal system (e.g., the liquid dispersal system 202) of the machine 100. Each liquid pump 124 may be any suitable liquid pumping mechanism that is configured to draw liquid (e.g., from a liquid reservoir) and supply the liquid (e.g., pressurized liquid) to the one or more liquid dispersal components 122. Each liquid pump 124 may have a constant flow (e.g., of liquid) capability, a variable flow capability, or another type of flow capability.

The machine 100 includes a sensor system 126, which may be configured to identify and/or determine speed information (e.g., a speed of the machine 100 or an intended speed of the machine 100, such as indicated by input of an operator of the machine 100 via the drive system control 108, the steering system control 110, and/or the control interface 112), rotation rate information associated with a compaction element 102 (e.g., a rate, such on the order of seconds, for the compaction element 102 to complete a rotation); and/or other information. The sensor system 126 may include, for example, a speed sensor, an accelerometer, a Global Positioning System (GPS) sensor, a compaction element rotation sensor, or other sensors.

The machine 100 includes a controller 128 (e.g., an electronic control module (ECM)). The controller 128 may be configured to implement various operations of the machine 100, such as liquid dispersal operations described in connection with FIGS. 2A-2E. The controller 128 may be communicatively connected to one or more systems of the machine 100, such as to provide autonomous control of one or more systems of the machine 100 (e.g., autonomous propulsion, steering, and/or braking). The controller 128 may be communicatively connected to a liquid dispersal system 202 of the machine 100, and may provide control of the liquid dispersal system 202, as described in connection with FIGS. 2A-2E.

As indicated above, FIG. 1 is provided as an example. Other examples may differ from what is described in connection with FIG. 1.

FIGS. 2A-2E show examples 200 of the machine 100 described herein. As shown, in FIGS. 2A-2E, the machine 100 includes the at least one compaction element 102, the control interface 112, the one or more liquid dispersal components 122, the one or more liquid pumps 124, the sensor system 126, and the controller 128. As further shown in FIGS. 2A-2E, the machine 100 may include a liquid dispersal system 202, which may comprise the one or more liquid dispersal components 122, the one or more liquid pumps 124, and/or the controller 128.

Each liquid pump 124 may be communicatively connected (e.g., by a wired connection or a wireless connection) to the controller 128. Thus, the controller 128 may transmit a signal to each liquid pump 124 that causes activation of the liquid pump 124 (e.g., causes the liquid pump 124 to turn on, to pump liquid, or the like) or causes inactivation of the liquid pump 124 (e.g., causes the liquid pump 124 to turn off, to cease pumping liquid, to refrain from pumping liquid, or the like), as further described herein. In some implementations, instead of causing activation or inactivation of each liquid pump 124, the controller 128 may cause (e.g., by transmitting a signal to the liquid pump 124) the liquid pump 124 to modify a pump rate (e.g., in terms of liters per minute, or another metric) of the liquid pump 124.

Figure 2A:
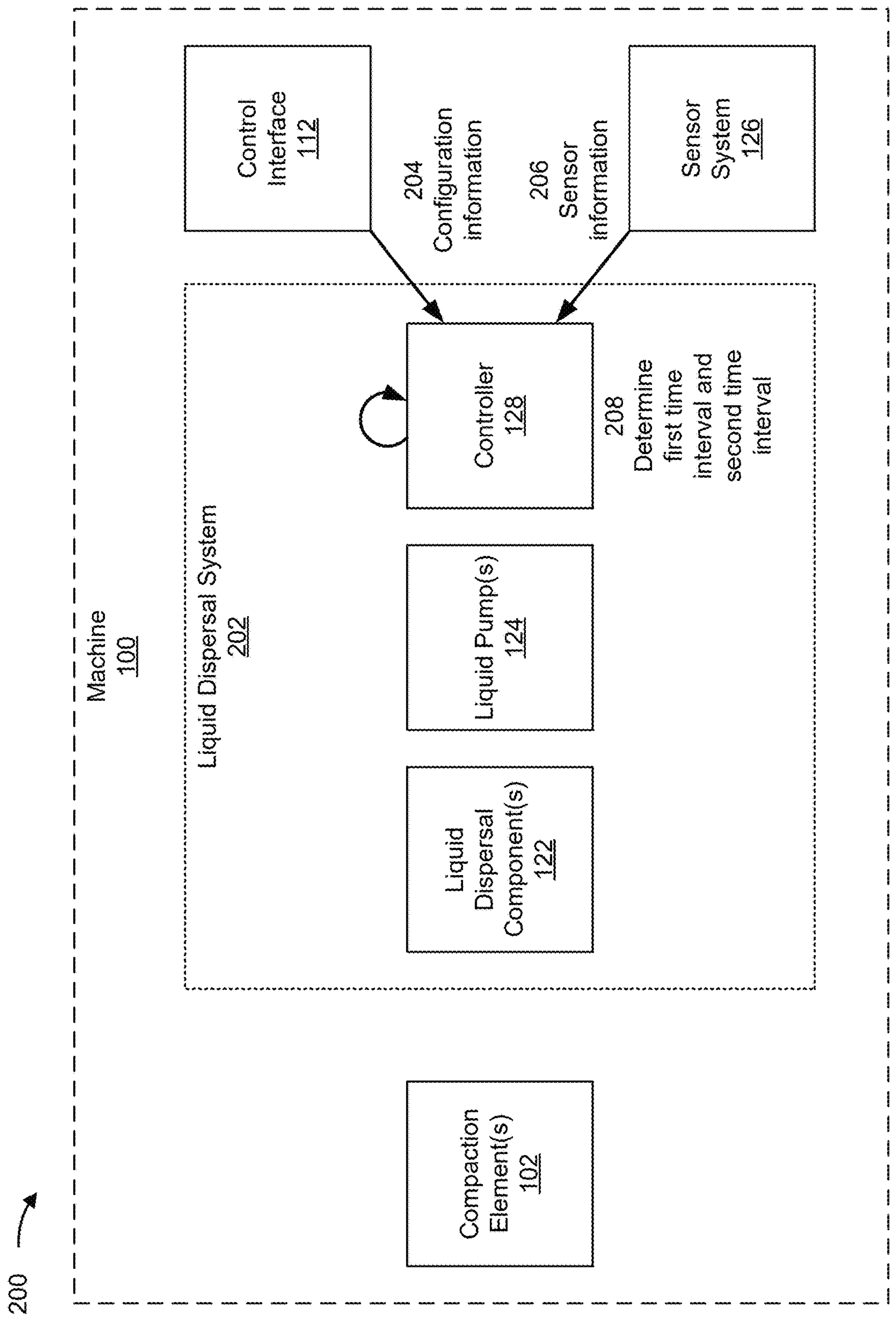
FIGS. 2A-2E show examples of the machine described herein.

As shown in FIG. 2A, and by reference number 204, the controller may obtain configuration information, such as from the control interface 112. For example, an operator, or other user, of the machine 100 may interact with the control interface 112 to input the configuration information. The control interface 112 may therefore send the configuration information to the controller 128, such as via a connection (e.g., a wired connection or a wireless connection) between the control interface 112 and the controller 128, which allows the controller 128 to receive the configuration information.

The configuration information may indicate a quantity of rotations of a compaction element 102 (of a particular compaction element 102 of the at least one compaction element 102, such as the front compaction element 102-1 or the back compaction element 102-2) of the machine 100. The configuration information may indicate a quantity of rotations of the compaction element 102 in association with a dispersal cycle of the liquid dispersal system 202. For example, the configuration information may indicate a quantity of rotations of the compaction element 102 for which liquid (e.g., water) is to be dispersed at the compaction element 102, such as via the one or more liquid dispersal components 122, during the dispersal cycle. In some implementations, the quantity of rotations may be expressed as an integer value (e.g., as a whole number, such as 1, 2, 3, or so on), or, alternatively may be express as a non-integer value (e.g., a number with a fraction or decimal component, such as 1.1, 1.25, 1.5, 2, 2.125, or so on).

Additionally, or alternatively, the configuration information may indicate a percentage of the dispersal cycle. For example, the configuration information may indicate a percentage of the dispersal cycle associated with the quantity of rotations of the compaction element 102. That is, the configuration information may indicate the quantity of rotations of the compaction element 102 are to be completed within the percentage of the dispersal cycle.

As shown by reference number 206, the controller 128 may obtain sensor information, such as from the sensor system 126. For example, the sensor system 126 may send the sensor information (e.g., as the sensor system 126 collects or determines the sensor information) to the controller 128, such as via a connection between the control interface 112 and the sensor system 126, which allows the controller 128 to receive the sensor information.

The sensor information may be associated with the machine 100. For example, the sensor information may include speed information associated with the machine 100 (e.g., a speed, or an intended speed, of the machine 100) and/or rotation rate information associated with the compaction element 102 (e.g., the particular compaction element 102 described herein), such as at one or more instants of time.

As shown by reference number 208, the controller 128 may determine a first time interval of the dispersal cycle and a second time interval of the dispersal cycle (e.g., based on the configuration information and/or the sensor information). The first time interval of the dispersal cycle is for dispersal of liquid at the at least one compaction element 102, such as via the one or more liquid dispersal components 122, and the second time interval of the dispersal cycle is for non-dispersal of liquid (e.g., via the one or more liquid dispersal components 122).

Accordingly, a duration of the dispersal cycle may be equal to a sum of the first time interval and the second time interval. That is, the duration of the dispersal cycle may comprise the first time interval immediately followed by the second time interval, or the second time interval immediately followed by the first time interval. The first time interval may be equal to (e.g., within a tolerance) the duration of the dispersal cycle multiplied by the percentage of the dispersal cycle (e.g., as indicated by the configuration information), and, accordingly, the second time interval may be equal to (e.g., within the tolerance) the duration of the dispersal cycle multiplied by a remaining percentage of the dispersal cycle (e.g., 100% minus the percentage of the dispersal cycle).

To determine the first time interval and the second time interval, the controller 128 may determine a speed associated with the machine 100 (e.g., based on the sensor information). For example, the controller 128 may process (e.g., read and/or parse) the sensor information to determine the speed. Additionally, the controller 128 may identify a circumference measurement associated with the compaction element 102 (e.g., the particular compaction element 102), which may be stored by a data structure that is included in and/or accessible to the machine 100. Accordingly, the controller 128 may determine the first time interval based on the speed, the circumference measurement, and the quantity of rotations of the compaction element 102 (e.g., that is indicated by the configuration information). For example, the controller 128 may determine the first time interval as an amount of time needed to complete the quantity of rotations of the compaction element 102 given the circumference measurement associated with the compaction element 102 and the speed associated with the machine 100. That is, the controller 128 may multiply the quantity of rotations by the circumference measurement to determine a product, and then may divide the product by the speed to determine the first time interval. The controller 128 then may determine the second time interval based on the first time interval and the percentage of the dispersal cycle (e.g., that is indicated by the configuration information). For example, the controller 128 may identify the first time interval as equal to (e.g., within a tolerance) a duration of the dispersal cycle multiplied by the percentage of the dispersal cycle. Accordingly, the controller 128 may determine the duration of the dispersal cycle (e.g., by dividing the first time interval by the percentage of the dispersal cycle), and determine the second time interval by subtracting the first time interval from the duration of the dispersal cycle.

Alternatively, to determine the first time interval and the second time interval, the controller 128 may determine rotation rate information associated with the compaction element 102 (e.g., based on the sensor information). For example, the controller 128 may process (e.g., read and/or parse) the sensor information to determine the rotation rate information.

Accordingly, the controller 128 may determine the first time interval based on the rotation rate information and the quantity of rotations of the compaction element 102 (e.g., that is indicated by the configuration information). For example, the controller 128 may determine the first time interval as an amount of time need to complete the quantity of rotations of the compaction element 102 given the rotation rate information. That is, the controller 128 may multiply the quantity of rotations by the rotation rate information to determine the first time interval. The controller 128 then may determine the second time interval based on the first time interval and the percentage of the dispersal cycle, as described above.

Figure 2B:
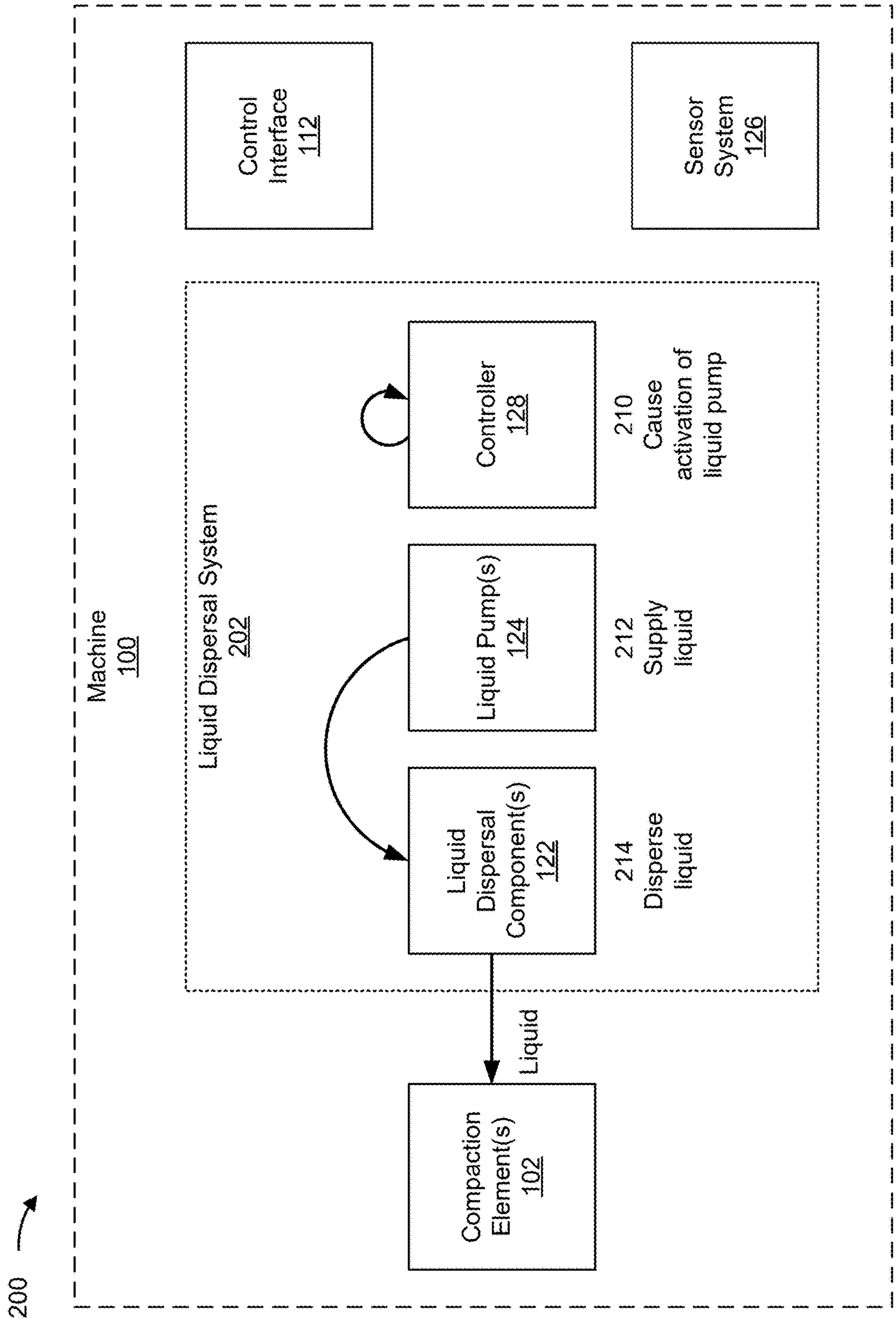

As shown in FIG. 2B, and by reference number 210, the controller 128 may cause activation of the one or more liquid pumps 124. For example, the controller 128 may cause activation of the one or more liquid pumps 124 in accordance with the first time interval. That is, as part of the dispersal cycle, the controller 128 may cause activation of the one or more liquid pumps 124 (e.g., for a duration of the first time interval). In some implementations, as an alternative to causing activation of the one or more liquid pumps 124, the controller 128 may cause (e.g., because the one or more liquid pumps 124 are already activated) the one or more liquid pumps 124 to have a first pump rate in accordance with the first time interval (e.g., for the duration of the first time interval).

As shown by reference number 212, causing activation of the one or more liquid pumps 124 (or causing the one or more liquid pumps 124 to have the first pump rate) (e.g., in accordance with the first time interval), may cause the one or more liquid pumps 124 to supply liquid (e.g., water) to the one or more liquid dispersal components 122 (e.g., at the first pump rate) during the first time interval (e.g., for a duration of the first time interval). As shown by reference number 214, the one or more liquid dispersal components 122 therefore may disperse liquid at the at least one compaction element 102 during the first time interval (e.g., for a duration of the first time interval). Accordingly, causing activation of the one or more liquid pumps 124 may cause liquid to be dispersed onto the at least one compaction element 102 during the first time interval 1 (e.g., for the quantity of rotations during the first time interval).

Figure 2C:
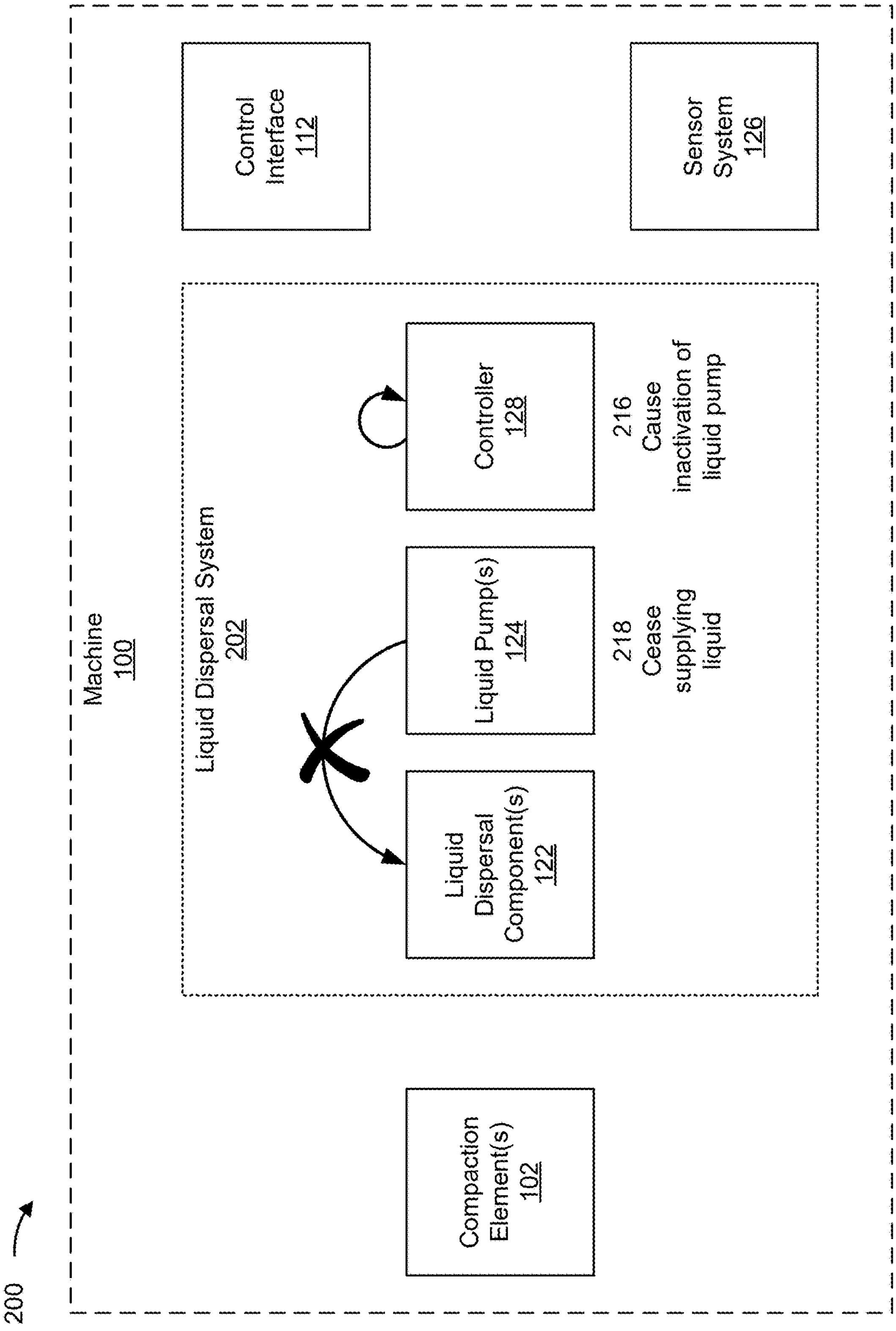

As shown in FIG. 2C, and by reference number 216, the controller 128 may cause inactivation of the one or more liquid pumps 124 (e.g., based on causing activation of the one or more liquid pumps 124). For example, the controller 128 may cause inactivation of the one or more liquid pumps 124 in accordance with the second time interval. That is, as part of the dispersal cycle, the controller 128 may cause inactivation of the one or more liquid pumps 124 (e.g., for a duration of the second time interval). In some implementations, as an alternative to causing inactivation of the one or more liquid pumps 124, the controller 128 may cause the one or more liquid pumps 124 to have a second pump rate (e.g., that is different than the first pump rate, such as second pump rate that is less than the first pump rate) in accordance with the second time interval (e.g., for the duration of the second time interval).

As shown by reference number 218, causing inactivation of the one or more liquid pumps 124 (e.g., in accordance with second first time interval), may cause the one or more liquid pumps 124 to cease supplying liquid (e.g., water) to the one or more liquid dispersal components 122 during the second time interval (e.g., for a duration of the second time interval). Accordingly, causing inactivation of the one or more liquid pumps 124 may prevent liquid from being dispersed onto the at least one compaction element 102 during the second time interval. In some implementations, causing the one or more liquid pumps 124 to have the second pump rate (e.g., that is less than the first pump rate) may reduce an amount of liquid that is dispersed onto the at least one compaction element 102 during the second time interval (e.g., for the duration of the second time interval).

While FIGS. 2B and 2C show the controller 128 causing activation of the one or more liquid pumps 124 (e.g., in accordance with the first time interval) followed by causing inactivation of the one or more liquid pumps 124 (e.g., in accordance with the second time interval) as part of the dispersal cycle, the controller 128 may cause inactivation of the one or more liquid pumps 124 (e.g., in accordance with the second time interval) followed by causing activation of the one or more liquid pumps 124 (e.g., in accordance with the first time interval) as part of the dispersal cycle. Moreover, the controller 128 may cause the one or more liquid pumps 124 to have a first pump rate (e.g., in accordance with the first time interval) followed by causing the one or more liquid pumps 124 to have a second pump rate (e.g., in accordance with the second time interval) as part of the dispersal cycle, or the controller 128 may cause the one or more liquid pumps 124 to have the second pump rate (e.g., in accordance with the second time interval) followed by causing the one or more liquid pumps 124 to have the first pump rate (e.g., in accordance with the first time interval) as part of the dispersal cycle.

Figure 2D:
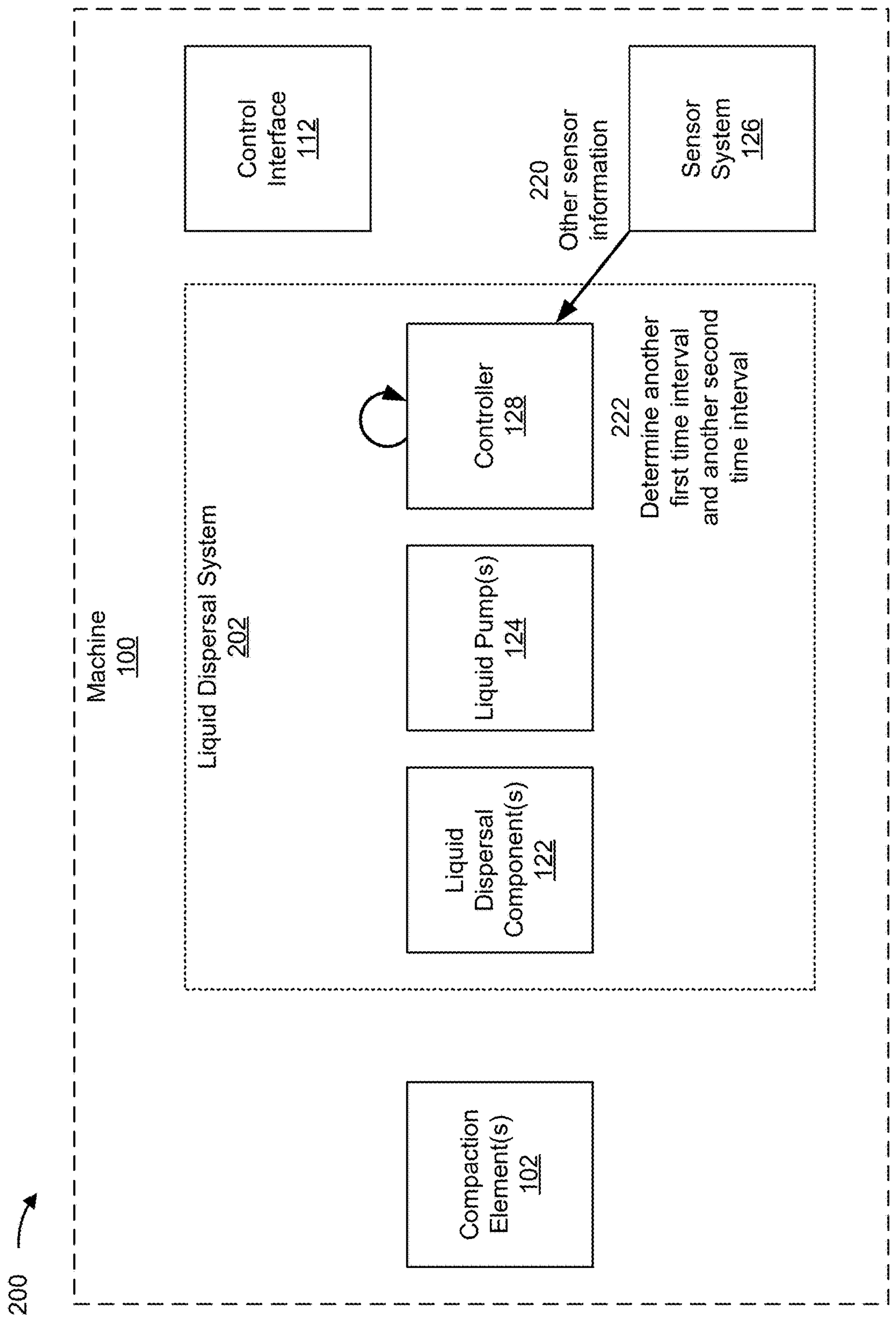

As shown in FIG. 2D, and by reference number 220, the controller 128 may obtain other sensor information, such as from the sensor system 126 (e.g., based on at least one of causing activation of the liquid pump or causing inactivation of the liquid pump, as described herein). For example, the sensor system 126 may send the other sensor information (e.g., as the sensor system 126 collects or determines the other sensor information) to the controller 128, such as via the connection between the control interface 112 and the sensor system 126, which allows the controller 128 to receive the other sensor information.

The other sensor information may be associated with the machine 100. For example, the sensor information may include other speed information associated with the machine 100 (e.g., a speed, or an intended speed, of the machine 100) and/or other rotation rate information associated with the compaction element 102 (e.g., the particular compaction element 102), such as at one or more other instants of time after the one or more instants of time associated with the sensor information.

As shown by reference number 222, the controller 128 may determine another first time interval of another dispersal cycle and another second time interval of another dispersal cycle (e.g., based on the configuration information and/or the other sensor information). The other first time interval of the other dispersal cycle is for dispersal of liquid at the at least one compaction element 102, such as via the one or more liquid dispersal components 122, and the other second time interval of the other dispersal cycle is for non-dispersal of liquid (e.g., via the one or more liquid dispersal components 122).

Accordingly, a duration of the other dispersal cycle may be equal to sum of the other first time interval and the other second time interval. That is, the duration of the other dispersal cycle may comprise the other first time interval immediately followed by the other second time interval, or the other second time interval immediately followed by the other first time interval. The other first time interval may be equal to (e.g., within a tolerance) the duration of the other dispersal cycle multiplied by the percentage indicated by the configuration information, and, accordingly, the other second time interval may be equal to (e.g., within the tolerance) the duration of the other dispersal cycle multiplied by a remaining percentage of the other dispersal cycle (e.g., 100% minus the percentage indicated by the configuration information).

The controller 128 may determine the other first time interval and the other second time interval of the other dispersal cycle in a similar manner as that described herein in relation to FIG. 2A and reference number 208. Notably, because a speed associated with the machine 100 and/or rotation rate information associated with the compaction element 102 (e.g., as indicated by the other sensor information) may be different than a corresponding speed and/or corresponding rotation rate information indicated by the sensor information, the other first time interval may be different than the first time interval and the other second time interval may be different than the second time interval. Thus, a duration of the other dispersal cycle may be different than a duration of the dispersal cycle.

Accordingly, the controller 128 may cause activation of the one or more liquid pumps 124 (e.g., in accordance with the other first time interval) and/or may cause inactivation of the one or more liquid pumps 124 (e.g., in accordance with the other second time interval), such as in a similar manner as that described herein in relation to FIGS. 2B and 2C. Alternatively, the controller 128 may cause the one or more liquid pumps 124 to have another first pump rate (e.g., in accordance with the other first time interval) and/or the controller 128 may cause the one or more liquid pumps 124 to have another second pump rate (e.g., in accordance with the other second time interval), such as in a similar manner as that described herein in relation to FIGS. 2B and 2C.

Figure 2E:
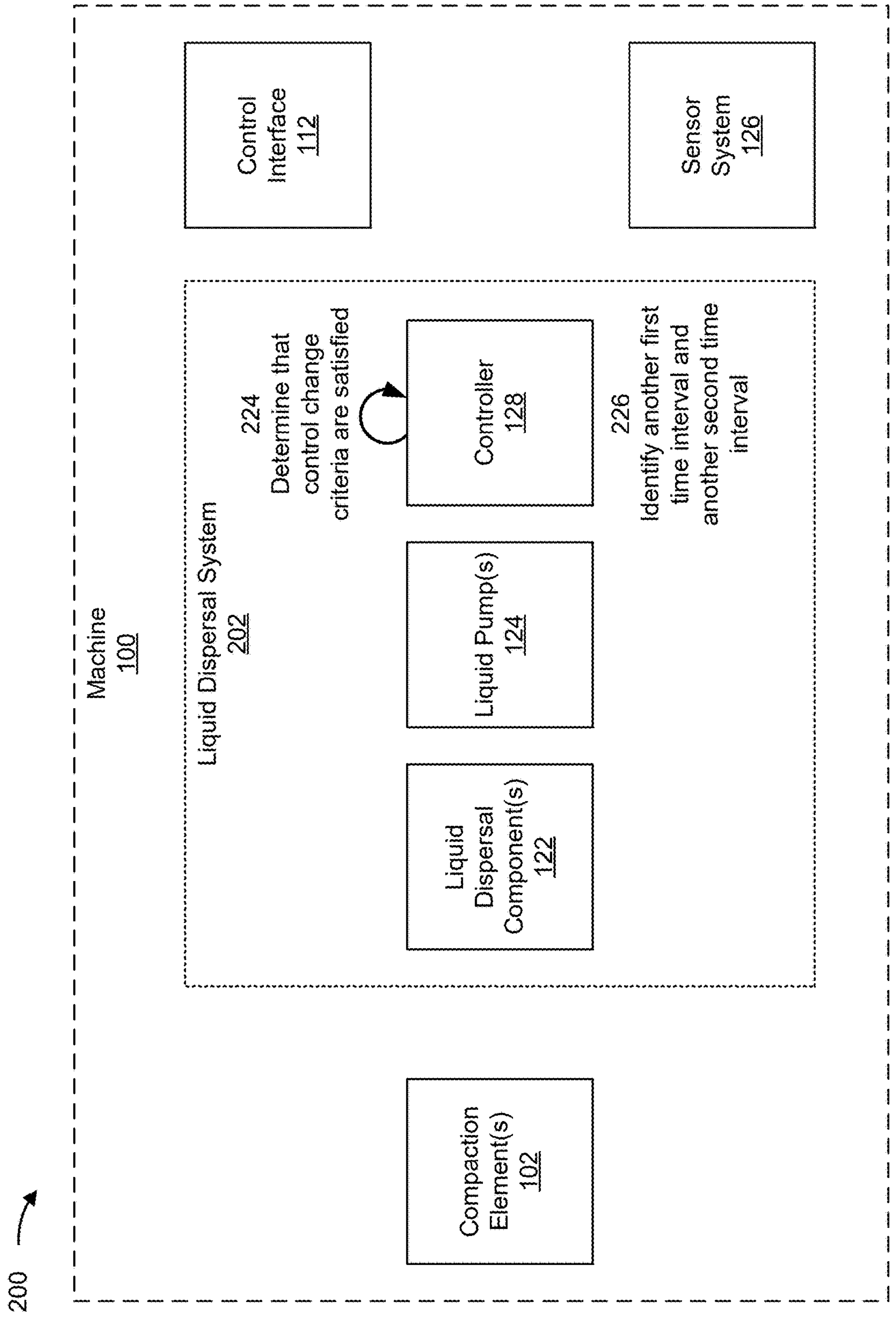

As an alternative to some or all of the operations described herein in relation to FIG. 2D, as shown in FIG. 2E, and by reference number 224, the controller 128 may determine that one or more control change criteria are satisfied (e.g., based on the other sensor information obtained by the controller 128, as described herein in relation to FIG. 2D and reference number 220). For example, the controller 128 may determine, based on the other sensor information, that a speed associated with the machine 100 is less than or equal to a minimum speed control change criterion and/or that a rotation rate associated with the compaction element 102 is less than or equal to a minimum rotation rate control change criterion. That is, the controller 128 may determine that that machine 100 is moving too slowly and/or that the compaction element 102 is moving too slowly, and may thereby determine that the one or more control change criteria are satisfied.

Accordingly, as shown by reference number 226, the controller 128 may identify another first time interval of another dispersal cycle (e.g., for dispersal of liquid at the compaction element 102, such as via the one or more liquid dispersal components 122) and another second time interval of another dispersal cycle (e.g., for non-dispersal of liquid, such as via the one or more liquid dispersal components 122). The other first time interval and the other second time interval may be stored in the data structure described herein, and the controller 128 may identify the other first time interval and the other second time interval by communicating with the data structure.

A duration of the other dispersal cycle may be equal to a sum of the other first time interval and the other second time interval. That is, the duration of the other dispersal cycle may comprise the other first time interval immediately followed by the other second time interval, or the other second time interval immediately followed by the other first time interval. Notably, the other first time interval may not be equal to the duration of the other dispersal cycle multiplied by the percentage indicated by the configuration information, and, accordingly, the other second time interval may not be equal to the duration of the other dispersal cycle multiplied by a remaining percentage of the other dispersal cycle (e.g., 100% minus the percentage indicated by the configuration information). Further, the other first time interval may be different than the first time interval and the other second time interval may be different than the second time interval. Thus, a duration of the other dispersal cycle may be different than a duration of the dispersal cycle.

Accordingly, the controller 128 may cause activation of the one or more liquid pumps 124 (e.g., in accordance with the other first time interval) and/or may cause inactivation of the one or more liquid pumps 124 (e.g., in accordance with the other second time interval), such as in a similar manner as that described herein in relation to FIGS. 2B and 2C. Alternatively, the controller 128 may cause the one or more liquid pumps 124 to have another first pump rate (e.g., in accordance with the other first time interval) and/or the controller 128 may cause the one or more liquid pumps 124 to have another second pump rate (e.g., in accordance with the other second time interval), such as in a similar manner as that described herein in relation to FIGS. 2B and 2C.

In this way, as described herein in relation to FIGS. 2D-2E, the controller 128 enables variable control of the liquid dispersal system 202. For example, the controller 128 causes at least one of activation or inactivation of the one or more liquid pumps 124 in accordance with a dispersal cycle that comprises a first time interval and a second time interval, and then the controller 128 causes at least one of activation or inactivation of the one or more liquid pumps 124 in accordance with another dispersal cycle that has a duration that is different than a duration of the dispersal cycle, such as because the other dispersal cycle comprises another first time interval that has a duration that is different than a duration of the first time interval and another second time interval that has a duration that is different than a duration of the second time interval.

As indicated above, FIGS. 2A-2E are provided as an example. Other examples may differ from what is described in connection with FIGS. 2A-2E.

Figure 3:
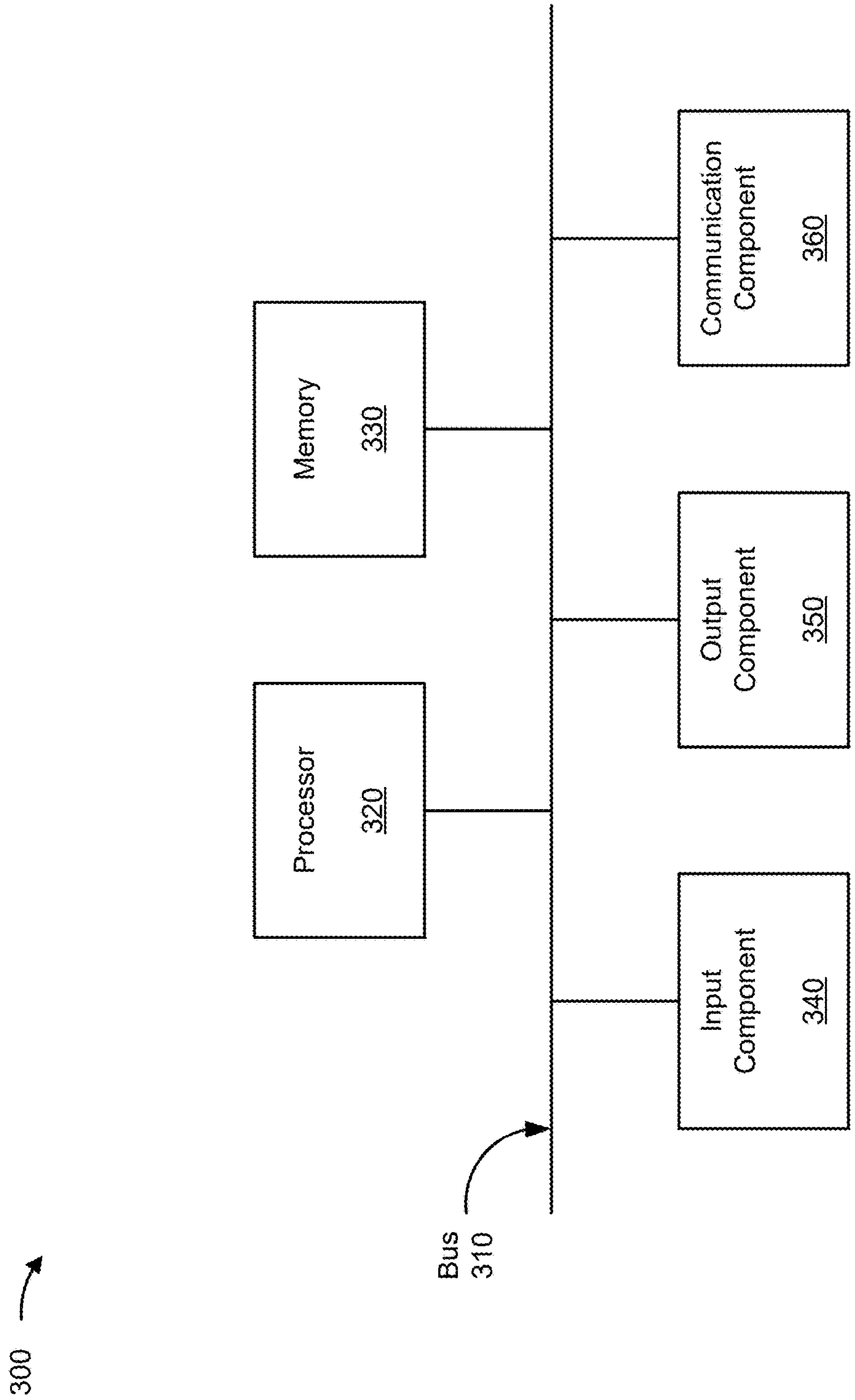
FIG. 3 is a diagram of example components of a device associated with variable control of a liquid dispersal system.

FIG. 3 is a diagram of example components of a device 300 associated with variable control of a liquid dispersal system. The device 300 may correspond to the control interface 112, the one or more liquid pumps 124, the sensor system 126, the controller 128, and/or the liquid dispersal system 202. In some implementations, the control interface 112, the one or more liquid pumps 124, the sensor system 126, the controller 128, and/or the liquid dispersal system 202 may include one or more devices 300 and/or one or more components of the device 300. As shown in FIG. 3, the device 300 may include a bus 310, a processor 320, a memory 330, an input component 340, an output component 350, and/or a communication component 360.

The bus 310 may include one or more components that enable wired and/or wireless communication among the components of the device 300. The bus 310 may couple together two or more components of FIG. 3, such as via operative coupling, communicative coupling, electronic coupling, and/or electric coupling. For example, the bus 310 may include an electrical connection (e.g., a wire, a trace, and/or a lead) and/or a wireless bus. The processor 320 may include a central processing unit, a graphics processing unit, a microprocessor, a controller, a microcontroller, a digital signal processor, a field-programmable gate array, an application-specific integrated circuit, and/or another type of processing component. The processor 320 may be implemented in hardware, firmware, or a combination of hardware and software. In some implementations, the processor 320 may include one or more processors capable of being programmed to perform one or more operations or processes described elsewhere herein.

The memory 330 may include volatile and/or nonvolatile memory. For example, the memory 330 may include random access memory (RAM), read only memory (ROM), a hard disk drive, and/or another type of memory (e.g., a flash memory, a magnetic memory, and/or an optical memory). The memory 330 may include internal memory (e.g., RAM, ROM, or a hard disk drive) and/or removable memory (e.g., removable via a universal serial bus connection). The memory 330 may be a non-transitory computer-readable medium. The memory 330 may store information, one or more instructions, and/or software (e.g., one or more software applications) related to the operation of the device 300. In some implementations, the memory 330 may include one or more memories that are coupled (e.g., communicatively coupled) to one or more processors (e.g., processor 320), such as via the bus 310. Communicative coupling between a processor 320 and a memory 330 may enable the processor 320 to read and/or process information stored in the memory 330 and/or to store information in the memory 330.

The input component 340 may enable the device 300 to receive input, such as user input and/or sensed input. For example, the input component 340 may include a touch screen, a keyboard, a keypad, a mouse, a button, a microphone, a switch, a sensor, a global positioning system sensor, a global navigation satellite system sensor, an accelerometer, a gyroscope, and/or an actuator. The output component 350 may enable the device 300 to provide output, such as via a display, a speaker, and/or a light-emitting diode. The communication component 360 may enable the device 300 to communicate with other devices via a wired connection and/or a wireless connection. For example, the communication component 360 may include a receiver, a transmitter, a transceiver, a modem, a network interface card, and/or an antenna.

The device 300 may perform one or more operations or processes described herein. For example, a non-transitory computer-readable medium (e.g., memory 330) may store a set of instructions (e.g., one or more instructions or code) for execution by the processor 320. The processor 320 may execute the set of instructions to perform one or more operations or processes described herein. Execution of the set of instructions, by one or more processors 320, causes the one or more processors 320 and/or the device 300 to perform the one or more operations or processes. Hardwired circuitry may be used instead of or in combination with the instructions to perform the one or more operations or processes. The processor 320 may be configured to perform the one or more operations or processes. Thus, implementations described herein are not limited to any specific combination of hardware circuitry and software.

The number and arrangement of components shown in FIG. 3 are provided as an example. The device 300 may include additional components, fewer components, different components, or differently arranged components than those shown in FIG. 3. A set of components (e.g., one or more components) of the device 300 may perform one or more functions described as being performed by another set of components of the device 300.

Figure 4:
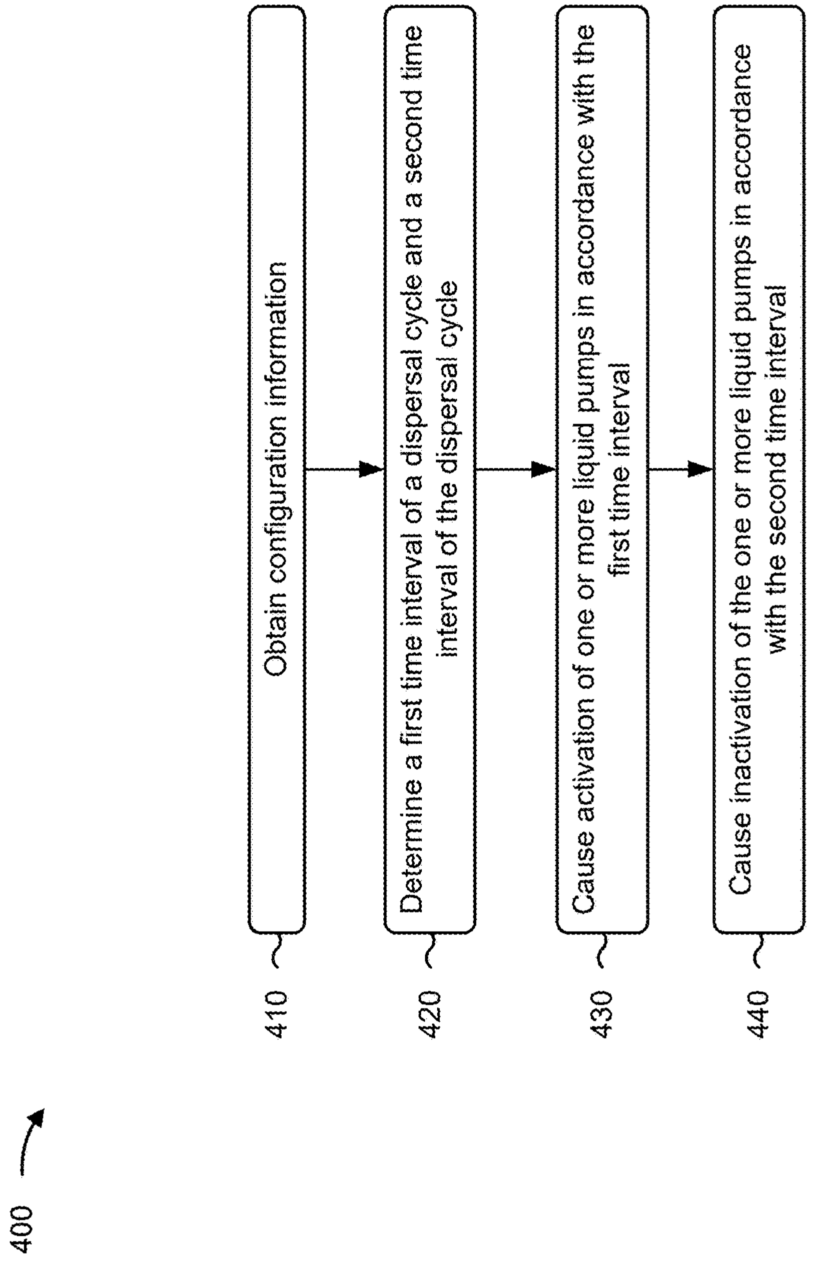
FIG. 4 is a flowchart of an example process associated with variable control of a liquid dispersal system.

FIG. 4 is a flowchart of an example process 400 associated with variable control of a liquid dispersal system. One or more process blocks of FIG. 4 may be performed by a liquid dispersal system (e.g., liquid dispersal system 202) of a machine (e.g., the machine 100), such as a compactor machine. Additionally, or alternatively, one or more process blocks of FIG. 4 may be performed by another device or a group of devices separate from or including the liquid dispersal system, such as another device or component that is internal or external to the liquid dispersal system and/or the machine.

As shown in FIG. 4, process 400 may include obtaining configuration information (block 410). For example, the liquid dispersal system may obtain configuration information, as described above. The configuration information may indicate a quantity of rotations of a compaction element of the compactor machine in association with a dispersal cycle and that indicates a percentage of the dispersal cycle.

As further shown in FIG. 4, process 400 may include determining a first time interval of the dispersal cycle and a second time interval of the dispersal cycle (block 420). For example, the liquid dispersal system may determine (e.g., based on the configuration information and sensor information) a first time interval of the dispersal cycle and a second time interval of the dispersal cycle, as described above. The first time interval may be equal to a duration of the dispersal cycle multiplied by the percentage of the dispersal cycle. Determining the first time interval of the dispersal cycle and the second time interval of the dispersal cycle comprises determining, based on the sensor information, at least one of a speed associated with the compactor machine or rotation rate information associated with the compaction element; determining, based on the at least one of the speed associated with the compactor machine or the rotation rate information associated with the compaction element and the configuration information, the first time interval of the dispersal cycle; and determining, based on the first time interval and the configuration information, the second time interval of the dispersal cycle.

As further shown in FIG. 4, process 400 may include causing activation of one or more liquid pumps in accordance with the first time interval (block 430). For example, the liquid dispersal system may cause activation of one or more liquid pumps (e.g., of the liquid dispersal system) in accordance with the first time interval, as described above.

As further shown in FIG. 4, process 400 may include causing inactivation of the one or more liquid pumps in accordance with the second time interval (block 440). For example, the liquid dispersal system may cause inactivation of the one or more liquid pumps in accordance with the second time interval, as described above.

Process 400 may include determining, based on the configuration information and other sensor information, another first time interval of another dispersal cycle and another second time interval of the other dispersal cycle, wherein the other first time interval is different than the first time interval and the other second time interval is different than the second time interval; causing activation of the one or more liquid pumps in accordance with the other first time interval; and causing inactivation of the one or more liquid pumps in accordance with the other second time interval.

Process 400 may include determining, based on other sensor information, that one or more control change criteria are satisfied; identifying, based on determining that the one or more control change criteria are satisfied, another first time interval of another dispersal cycle and another second time interval of the other dispersal cycle; causing activation of the one or more liquid pumps in accordance with the other first time interval; and causing inactivation of the one or more liquid pumps in accordance with the other second time interval.

Although FIG. 4 shows example blocks of process 400, in some implementations, process 400 may include additional blocks, fewer blocks, different blocks, or differently arranged blocks than those depicted in FIG. 4. Additionally, or alternatively, two or more of the blocks of process 400 may be performed in parallel.

INDUSTRIAL APPLICABILITY

The liquid dispersal system described herein can be used with any machine that utilizes liquid dispersal. For example, the liquid dispersal system can be used with a machine that includes a compaction element, such as a compaction drum, for compaction of soil, paving material, or the like.

A typical liquid dispersal system allows for manual input (e.g., by an operator of the machine) of a time duration for dispersal of liquid onto the compaction element. However, this control process is imprecise and unintuitive (e.g., because it's based on an inputting a time duration), which often results in wasting fluid (e.g., by allowing dispersal of more liquid onto the compaction element than is necessary to prevent sticking of paving material on the compaction element), or an impacted compaction performance of the machine (e.g., by disallowing dispersal of enough liquid to prevent sticking of paving material on the compaction element).

In some implementations described herein, a controller of the liquid dispersal system may determine, based on configuration information and sensor information, a first time interval of a dispersal cycle for dispersal of liquid at a compaction element and a second time interval of the dispersal cycle for non-dispersal of liquid. The configuration information may be input by an operator of the machine, and may indicate a quantity of rotations of the compaction element for which liquid is to be dispersed at the compaction element during the dispersal cycle and a percentage of the dispersal cycle that is associated with the quantity of rotations. The sensor information may indicate a speed of the machine or a rotation rate of the compaction element.

Accordingly, the controller causes one or more liquid pumps of the liquid dispersal system to activate in accordance with the first time interval (e.g., for a duration of the first time interval, such as to allow liquid to be dispersed onto the compaction element for the quantity of rotations) and cause the one or more liquid pumps to be inactive in accordance with the second time interval (e.g., for a duration of the second time interval, such as to prevent liquid from being dispersed on the compaction element for the second time interval). In some implementations, the controller causes the one or more liquid pumps to have a first pump rate in accordance with the first time interval (e.g., for a duration of the first time interval, such as to allow a particular amount of liquid to be dispersed onto the compaction element for the quantity of rotations) and causes the one or more liquid pumps to have a second pump rate in accordance with the second time interval (e.g., for a duration of the second time interval, such as to allow lesser amount of liquid to be dispersed onto the compaction element for the second time interval).

In this way, some implementations enable variable control of the liquid dispersal system, such that durations of the first time interval and the second time interval may change with respect to a changing speed of the machine and/or rotation rate of the compaction element. Thus, the liquid dispersal system increases a likelihood that liquid is dispersed efficiently (e.g., by decreasing a likelihood of dispersal of more liquid onto the compaction element than is necessary to prevent sticking of paving material on the compaction element and/or by decreasing a likelihood of dispersal of not enough liquid to prevent sticking of paving material on the compaction element). This decreases a quantity of times a liquid reservoir needs to be refilled (e.g., to provide a supply of liquid to be dispersed) and thereby increases a productivity of the machine (e.g., by reducing an amount of downtime that is required to refill the liquid reservoir), and additionally increases a quality of a paving mat compacted by the machine. Inputting the configuration information is also more intuitive for an operator of the machine (e.g., because the configuration information indicates a quantity of rotations of the compactor element and an percentage of the dispersal cycle, rather than an arbitrary time duration), which increases a likelihood that the controller determines an optimal first time interval and second time interval of the dispersal cycle.

The foregoing disclosure provides illustration and description, but is not intended to be exhaustive or to limit the implementations to the precise forms disclosed. Modifications and variations may be made in light of the above disclosure or may be acquired from practice of the implementations. Furthermore, any of the implementations described herein may be combined unless the foregoing disclosure expressly provides a reason that one or more implementations cannot be combined. Even though particular combinations of features are recited in the claims and/or disclosed in the specification, these combinations are not intended to limit the disclosure of various implementations. Although each dependent claim listed below may directly depend on only one claim, the disclosure of various implementations includes each dependent claim in combination with every other claim in the claim set.

What is claimed is:

1. A liquid dispersal system, comprising:

one or more liquid dispersal components configured to disperse liquid at a compaction element of a compactor machine;

one or more liquid pumps configured to supply liquid to the one or more liquid dispersal components; and a controller configured to:

obtain configuration information that indicates a quantity of rotations of the compaction element of the compactor machine for which liquid is to be dispersed at the compaction element via the one or more liquid dispersal components during a dispersal cycle and that indicates a percentage of the dispersal cycle associated with the quantity of rotations;

obtain sensor information associated with the compactor machine;

determine, based on the configuration information and the sensor information, a first time interval of the dispersal cycle for dispersal of liquid at the compaction element via the one or more liquid dispersal components and a second time interval of the dispersal cycle for non-dispersal of liquid via the one or more liquid dispersal components;

cause activation of the one or more liquid pumps in accordance with the first time interval; and cause, based on causing activation of the one or more liquid pumps, inactivation of the one or more liquid pumps in accordance with the second time interval.

2. The liquid dispersal system of claim 1, wherein a duration of the dispersal cycle is equal to a sum of the first time interval and the second time interval.

3. The liquid dispersal system of claim 2, wherein the first time interval is equal to the duration of the dispersal cycle multiplied by the percentage of the dispersal cycle.

4. The liquid dispersal system of claim 1, wherein causing activation of the one or more liquid pumps in accordance with the first time interval causes:

the one or more liquid pumps to supply liquid to the one or more liquid dispersal components during the first time interval;

the one or more liquid dispersal components to disperse liquid at the compaction element during the first time interval; and liquid to be dispersed onto the compaction element for the quantity of rotations during the first time interval.

5. The liquid dispersal system of claim 1, wherein the controller, to determine the first time interval of the dispersal cycle and the second time interval of the dispersal cycle, is configured to:

identify a circumference measurement associated with the compaction element;

determine, based on the sensor information, a speed associated with the compactor machine;

determine, based on the circumference measurement, the speed, and the quantity of rotations of the compaction element, the first time interval of the dispersal cycle; and determine, based on the first time interval and the percentage of the dispersal cycle, the second time interval of the dispersal cycle.

6. The liquid dispersal system of claim 1, wherein the controller, to determine the first time interval of the dispersal cycle and the second time interval of the dispersal cycle, is configured to:

determine, based on the sensor information, rotation rate information associated with the compaction element;

determine, based on the rotation rate information and the quantity of rotations of the compaction element, the first time interval of the dispersal cycle; and determine, based on the first time interval and the percentage of the dispersal cycle, the second time interval of the dispersal cycle.

7. The liquid dispersal system of claim 1, wherein the controller is further configured to:

obtain, based on at least one of causing activation of the one or more liquid pumps or causing inactivation of the one or more liquid pumps, other sensor information associated with the compactor machine;

determine, based on the configuration information and the other sensor information, another first time interval of another dispersal cycle for dispersal of liquid at the compaction element via the one or more liquid dispersal components and another second time interval of the other dispersal cycle for non-dispersal of liquid via the one or more liquid dispersal components, wherein the other first time interval is different than the first time interval and the other second time interval is different than the second time interval;

cause activation of the one or more liquid pumps in accordance with the other first time interval; and cause, based on causing activation of the one or more liquid pumps in accordance with the other first time interval, inactivation of the one or more liquid pumps in accordance with the other second time interval.

8. The liquid dispersal system of claim 1, wherein the controller is further configured to:

obtain, based on at least one of causing activation of the one or more liquid pumps or causing inactivation of the one or more liquid pumps, other sensor information associated with the compactor machine;

determine, based on the other sensor information, that one or more control change criteria are satisfied;

identify, based on determining that the one or more control change criteria are satisfied, another first time interval of another dispersal cycle for dispersal of liquid at the compaction element via the one or more liquid dispersal components and another second time interval of the other dispersal cycle for non-dispersal of liquid via the one or more liquid dispersal components;

cause activation of the one or more liquid pumps in accordance with the other first time interval; and cause, based on causing activation of the one or more liquid pumps in accordance with the other first time interval, inactivation of the one or more liquid pumps in accordance with the other second time interval.

9. A compactor machine, comprising:

a compaction element;

a liquid dispersal system, comprising:

one or more liquid pumps; and a controller configured to:

obtain configuration information that indicates a quantity of rotations of the compaction element for which liquid is to be dispersed at the compaction element during a dispersal cycle and that indicates a percentage of the dispersal cycle associated with the quantity of rotations;

obtain sensor information;

determine, based on the configuration information and the sensor information, a first time interval of the dispersal cycle for dispersal of liquid at the compaction element and a second time interval of the dispersal cycle for non-dispersal of liquid;

cause activation of the one or more liquid pumps in accordance with the first time interval; and cause, based on causing activation of the one or more liquid pumps, inactivation of the one or more liquid pumps in accordance with the second time interval.

10. The compactor machine of claim 9, wherein the first time interval is equal to a duration of the dispersal cycle multiplied by the percentage of the dispersal cycle.

11. The compactor machine of claim 9, wherein causing activation of the one or more liquid pumps in accordance with the first time interval causes liquid to be dispersed onto the compaction element for the quantity of rotations during the first time interval.

12. The compactor machine of claim 9, wherein the controller, to determine the first time interval of the dispersal cycle and the second time interval of the dispersal cycle, is configured to:

determine, based on the sensor information, a speed associated with the compactor machine;

determine, based on the speed and the quantity of rotations of the compaction element, the first time interval of the dispersal cycle; and determine, based on the first time interval and the percentage of the dispersal cycle, the second time interval of the dispersal cycle.

13. The compactor machine of claim 9, wherein the controller, to determine the first time interval of the dispersal cycle and the second time interval of the dispersal cycle, is configured to:

determine, based on the sensor information, rotation rate information associated with the compaction element;

determine, based on the rotation rate information and the quantity of rotations of the compaction element, the first time interval of the dispersal cycle; and determine, based on the first time interval and the percentage of the dispersal cycle, the second time interval of the dispersal cycle.

14. The compactor machine of claim 9, wherein the controller is further configured to:

obtain other sensor information associated with the compactor machine;

determine, based on the configuration information and the other sensor information, another first time interval of another dispersal cycle for dispersal of liquid at the compaction element and another second time interval of the other dispersal cycle for non-dispersal of liquid, wherein the other first time interval is different than the first time interval and the other second time interval is different than the second time interval;

cause activation of the one or more liquid pumps in accordance with the other first time interval; and cause, based on causing activation of the one or more liquid pumps in accordance with the other first time interval, inactivation of the one or more liquid pumps in accordance with the other second time interval.

15. The compactor machine of claim 9, wherein the controller is further configured to:

obtain other sensor information associated with the compactor machine;

determine, based on the other sensor information, that one or more control change criteria are satisfied;

identify, based on determining that the one or more control change criteria are satisfied, another first time interval of another dispersal cycle for dispersal of liquid at the compaction element and another second time interval of the other dispersal cycle for non-dispersal of liquid;

cause activation of the one or more liquid pumps in accordance with the other first time interval; and cause, based on causing activation of the one or more liquid pumps, inactivation of the one or more liquid pumps in accordance with the other second time interval.

16. A method, comprising:

obtaining, by a liquid dispersal system of a compactor machine, configuration information that indicates a quantity of rotations of a compaction element of the compactor machine in association with a dispersal cycle and that indicates a percentage of the dispersal cycle;

determining, by the liquid dispersal system, and based on the configuration information and sensor information, a first time interval of the dispersal cycle and a second time interval of the dispersal cycle;

causing, by the liquid dispersal system, activation of one or more liquid pumps of the liquid dispersal system in accordance with the first time interval; and causing, by the liquid dispersal system, inactivation of the one or more liquid pumps in accordance with the second time interval.

17. The method of claim 16, wherein the first time interval is equal to a duration of the dispersal cycle multiplied by the percentage of the dispersal cycle.

18. The method of claim 16, wherein determining the first time interval of the dispersal cycle and the second time interval of the dispersal cycle comprises:

determining, based on the sensor information, at least one of a speed associated with the compactor machine or rotation rate information associated with the compaction element;

determining, based on the at least one of the speed associated with the compactor machine or the rotation rate information associated with the compaction element and the configuration information, the first time interval of the dispersal cycle; and determining, based on the first time interval and the configuration information, the second time interval of the dispersal cycle.

19. The method of claim 16, further comprising:

determining, based on the configuration information and other sensor information, another first time interval of another dispersal cycle and another second time interval of the other dispersal cycle, wherein the other first time interval is different than the first time interval and the other second time interval is different than the second time interval;

causing activation of the one or more liquid pumps in accordance with the other first time interval; and causing inactivation of the one or more liquid pumps in accordance with the other second time interval.

20. The method of claim 16, further comprising:

determining, based on other sensor information, that one or more control change criteria are satisfied;

identifying, based on determining that the one or more control change criteria are satisfied, another first time interval of another dispersal cycle and another second time interval of the other dispersal cycle;

causing activation of the one or more liquid pumps in accordance with the other first time interval; and causing inactivation of the one or more liquid pumps in accordance with the other second time interval.

* * * * *